(12) United States Patent
Barker

(10) Patent No.: US 8,646,702 B2
(45) Date of Patent: Feb. 11, 2014

(54) BOOM FOLD STRUCTURE

(75) Inventor: Mark E. Barker, Ankeny, IA (US)

(73) Assignee: Deere & Company, Moline, IL (US)

( * ) Notice: Subject to any disclaimer, the term of this patent is extended or adjusted under 35 U.S.C. 154(b) by 302 days.

(21) Appl. No.: 13/272,517

(22) Filed: Oct. 13, 2011

(65) Prior Publication Data

US 2013/0092753 A1    Apr. 18, 2013

(51) Int. Cl.
*B05B 1/20* (2006.01)
(52) U.S. Cl.
USPC ........... 239/167; 239/159; 239/164; 239/166; 239/172; 172/311; 172/459; 16/367
(58) Field of Classification Search
USPC ................. 239/159, 160, 161, 164–167, 172; 172/311, 456, 459; 16/367
See application file for complete search history.

(56) References Cited

U.S. PATENT DOCUMENTS

| | | | |
|---|---|---|---|
| 4,739,930 A | 4/1988 | Pask | |
| 5,178,328 A | 1/1993 | Broyhill | |
| 6,035,942 A * | 3/2000 | Smith et al. | 172/311 |
| 6,293,475 B1 * | 9/2001 | Sobolik | 239/167 |
| 6,837,446 B1 | 1/2005 | Jesse | |
| 7,431,221 B2 * | 10/2008 | Thompson et al. | 239/166 |
| 8,342,256 B2 * | 1/2013 | Adams et al. | 172/311 |
| 2006/0144970 A1 | 7/2006 | Hagie | |
| 2007/0240889 A1 | 10/2007 | Neudorf et al. | |

FOREIGN PATENT DOCUMENTS

| | | |
|---|---|---|
| DE | 3628605 A1 | 2/1988 |
| EP | 1481536 A1 | 12/2004 |
| GB | 842856 | 7/1960 |

OTHER PUBLICATIONS

European Search Report, dated Feb. 8, 2013 (5 pages).

\* cited by examiner

*Primary Examiner* — Steven J Ganey

(57) ABSTRACT

A fold structure for a boom. The boom includes an inner boom portion having an inner boom portion top surface and an outer boom portion having an outer boom portion top surface. In a working position the inner boom portion and the outer boom portion are aligned lengthwise. The fold structure includes a bracket, a first hinge coupled to the bracket and configured to be pivotally coupled to the inner boom portion, and a second hinge coupled to the bracket and configured to be pivotally coupled to the outer boom portion. The first hinge is configured to allow the outer boom portion to rotate approximately 180 degrees in a first direction placing the boom in a first folded position. The second hinge is configured to allow the outer boom portion to rotate approximately 180 degrees in a second direction placing the boom in a second folded position.

20 Claims, 4 Drawing Sheets

BOOM FOLD STRUCTURE

FIELD OF THE DISCLOSURE

The present disclosure generally relates to fold structure, and more particularly to fold structure for booms of agricultural implements.

BACKGROUND OF THE DISCLOSURE

In order to dispense treatments onto a field, agricultural implements commonly include a frame, a set of wheels, a tank for storing a treatment to be dispensed, and a set of booms having fold structure. Each boom typically includes an inner boom portion positioned closest to the implement, an outer boom portion, a breakaway portion positioned furthest from the implement, and a single-acting hinge, or pivot axis, positioned between each portion enabling the boom to fold.

In a working position the inner boom portion, the outer boom portion, and the breakaway portion are typically aligned lengthwise and positioned perpendicular to the agricultural implement for spraying a maximum field width. In a transport position, the booms are folded in order to meet agricultural implement transport width requirements on public roads. The breakaway portion is typically folded 180 degrees sideways back by the outer boom portion. The outer boom portion is typically folded 180 degrees upwards onto the inner boom portion. The inner boom portion is then typically folded 90 degrees sideways next to the agricultural implement.

U.S. Pat. No. 4,739,930 discloses a double-acting hinge positioned between a first boom portion and a second boom portion. The double-acting hinge allows for a first 90 degree fold and a second 90 degree fold of the second boom portion relative to the first boom portion.

A double-acting hinge that would allow a first fold that is greater than 90 degrees and a second fold that is greater than 90 degrees would allow for more folding arrangements between portions in order to meet a desired fold width, fold height, or other requirement.

SUMMARY OF THE DISCLOSURE

In one embodiment, a fold structure for a boom is disclosed. The boom includes an inner boom portion having an inner boom portion top surface and an outer boom portion having an outer boom portion top surface. In a working position the inner boom portion is aligned lengthwise with the outer boom portion.

The fold structure includes a bracket, a first hinge (or pivot axis) coupled to the bracket and configured to be pivotally coupled to the inner boom portion, and a second hinge (or pivot axis) coupled to the bracket and configured to be pivotally coupled to the outer boom portion. The bracket may be made from steel or a light weight material (e.g., aluminum). The bracket may be triangle shaped, rectangle shaped, or other shapes. The second hinge may be coupled to the bracket approximately perpendicular to the first hinge. The first hinge is configured to allow the outer boom portion to rotate approximately 180 degrees in a first direction such that the outer boom portion overlies the inner boom portion placing the boom in a first folded position. Approximately 180 degrees is intended to include slightly less than 180 degrees and slightly greater than 180 degrees. The second hinge is configured to allow the outer boom portion to rotate approximately 180 degrees in a second direction that is approximately perpendicular to the first direction such that the inner boom portion top surface is in a facing relationship with the outer boom portion top surface, placing the boom in a second folded position. Approximately 180 degrees is intended to include slightly less than 180 degrees and slightly greater than 180 degrees.

In another embodiment, a boom including fold structure is disclosed. The boom includes an inner boom portion having an inner boom portion top surface, an outer boom portion having an outer boom portion top surface, and a bracket. The bracket is coupled to the inner boom portion and the outer boom portion for pivotal movement of the outer boom portion relative to the inner boom portion about a first axis between a working position in which the inner boom portion and the outer boom portion are aligned lengthwise and a first folded position in which the outer boom portion is rotated approximately 180 degrees about the first axis and overlies the inner boom portion. Approximately 180 degrees is intended to include slightly less than 180 degrees and slightly greater than 180 degrees. The bracket is coupled to the inner boom portion and the outer boom portion for pivotal movement of the outer boom portion relative to the inner boom portion about a second axis, which is approximately perpendicular to the first axis, between the first folded position and a second folded position in which the outer boom portion is rotated approximately 180 degrees about the second axis and the inner boom portion top surface is in a facing relationship with the outer boom portion top surface. Approximately 180 degrees is intended to include slightly less than 180 degrees and slightly greater than 180 degrees. The bracket may be made from steel or a light weight material (e.g., aluminum). The bracket may be triangle shaped, rectangle shaped, or other shapes.

In yet another embodiment, an agricultural implement is disclosed. The agricultural implement includes a frame, a pair of transversely spaced wheels coupled to the frame, a tank coupled to the frame for storing a treatment to be dispensed, and a boom having fold structure.

The boom includes an inner boom portion having an inner boom portion top surface, an outer boom portion having an outer boom portion top surface, and a bracket. The bracket is coupled to the inner boom portion and the outer boom portion for pivotal movement of the outer boom portion relative to the inner boom portion about a first axis between a working position in which the inner boom portion and the outer boom portion are aligned lengthwise and a first folded position in which the outer boom portion is rotated approximately 180 degrees about the first axis and overlies the inner boom portion. Approximately 180 degrees is intended to include slightly less than 180 degrees and slightly greater than 180 degrees. The bracket is coupled to the inner boom portion and the outer boom portion for pivotal movement of the outer boom portion relative to the inner boom portion about a second axis, which is approximately perpendicular to the first axis, between the first folded position and a second folded position in which the outer boom portion is rotated approximately 180 degrees about the second axis and the inner boom portion top surface is in a facing relationship with the outer boom portion top surface. Approximately 180 degrees is intended to include slightly less than 180 degrees and slightly greater than 180 degrees. When the boom is in the second folded position, the agricultural implement is in a transport position. The bracket may be made from steel or a light weight material (e.g., aluminum). The bracket may be triangle shaped, rectangle shaped, or other shapes.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
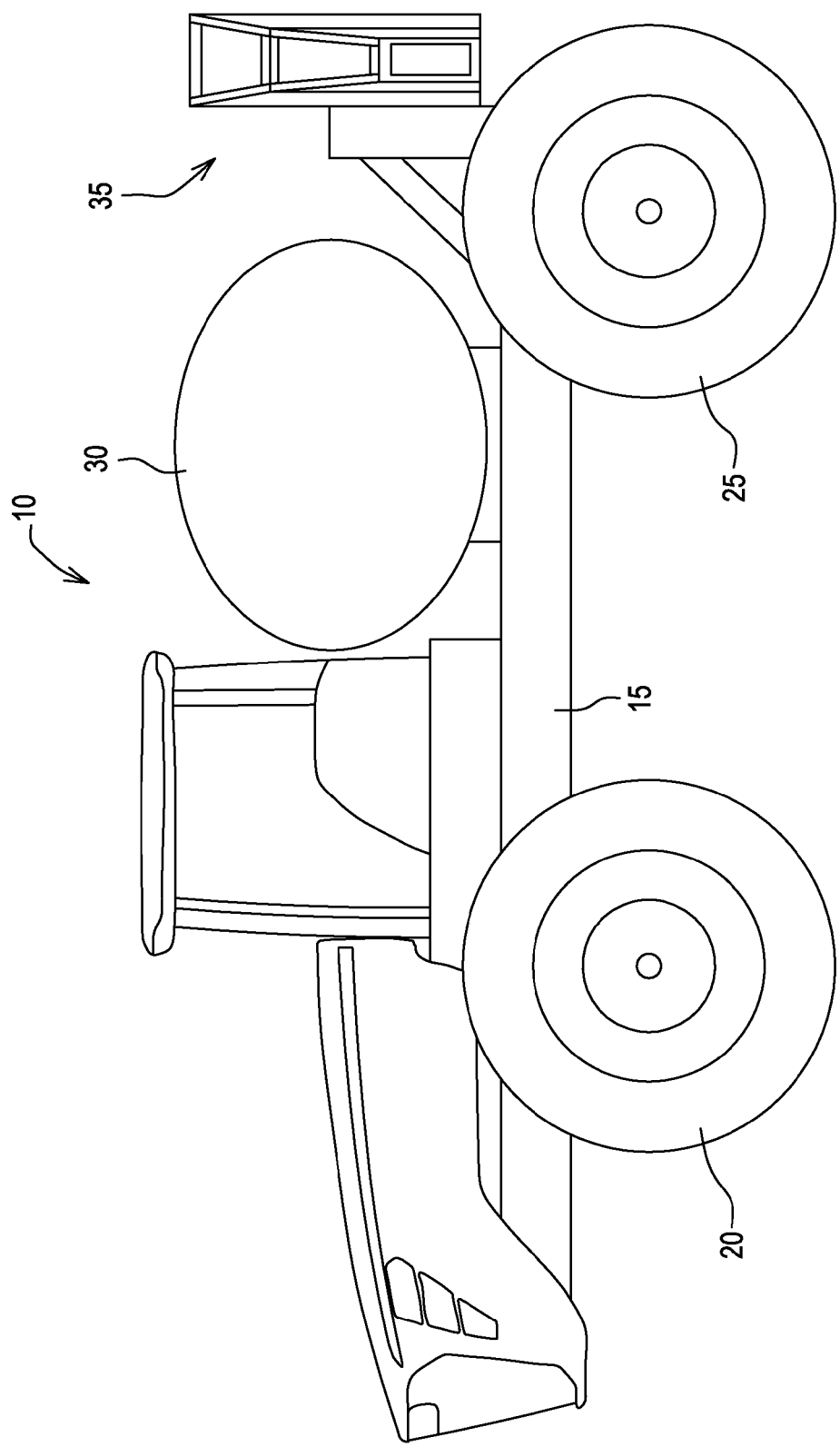
FIG. 1 is a side view of an agricultural implement according to one embodiment.

FIG. 1 illustrates an agricultural implement 10. The illustrated agricultural implement 10 includes a frame 15, one or more front wheels 20, a set of rear wheels 25, a tank 30 for storing a treatment (e.g., chemical) to be dispensed, and a set of booms 35 having a fold structure 37. Alternatively, the agricultural implement 10 may be a pull-behind type device (not shown) with no front wheel.

Figure 2:
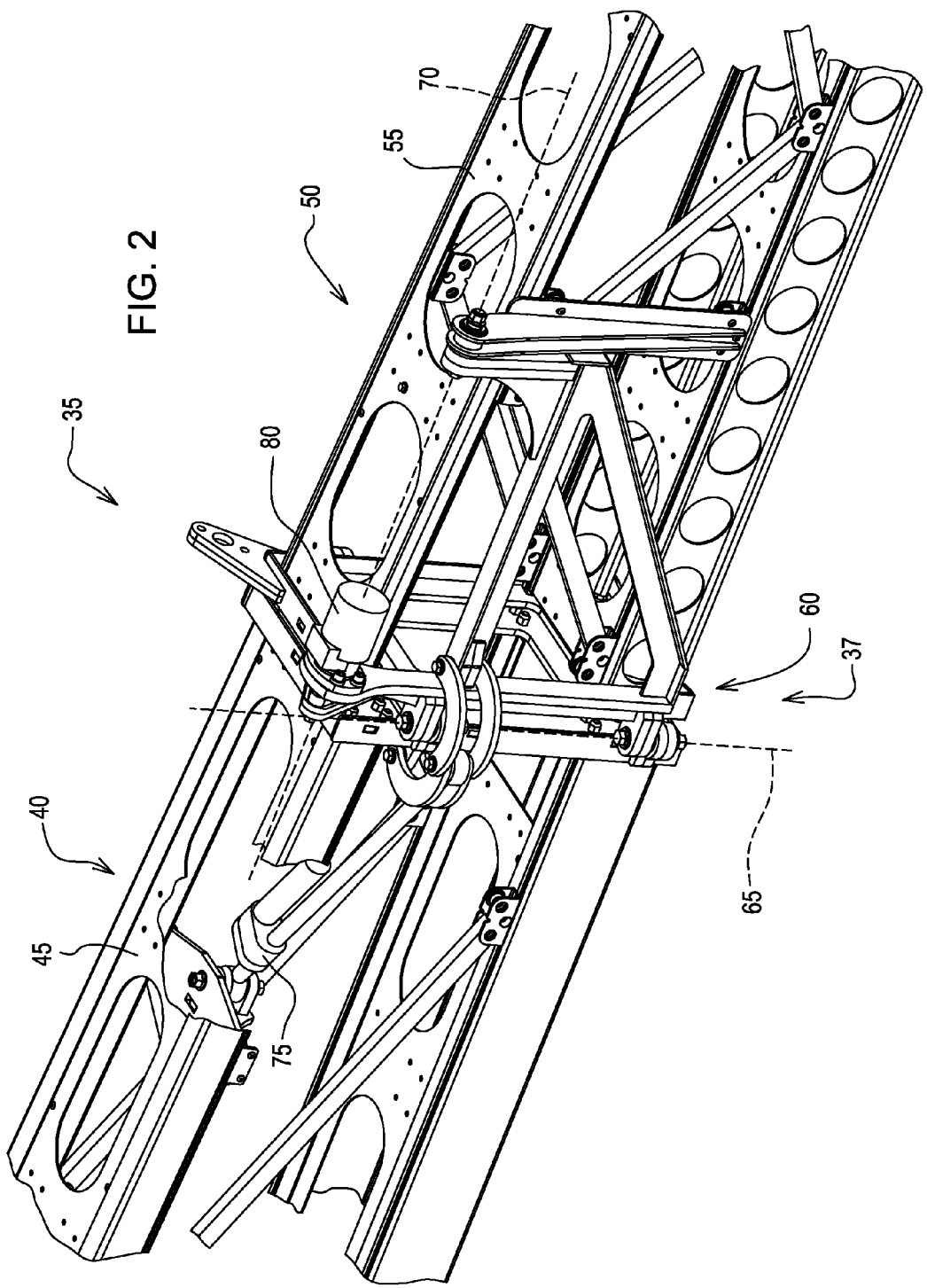
FIG. 2 is an enlarged, partially sectioned, perspective view of a portion of a boom of the agricultural implement shown in FIG. 1.
Figure 3:
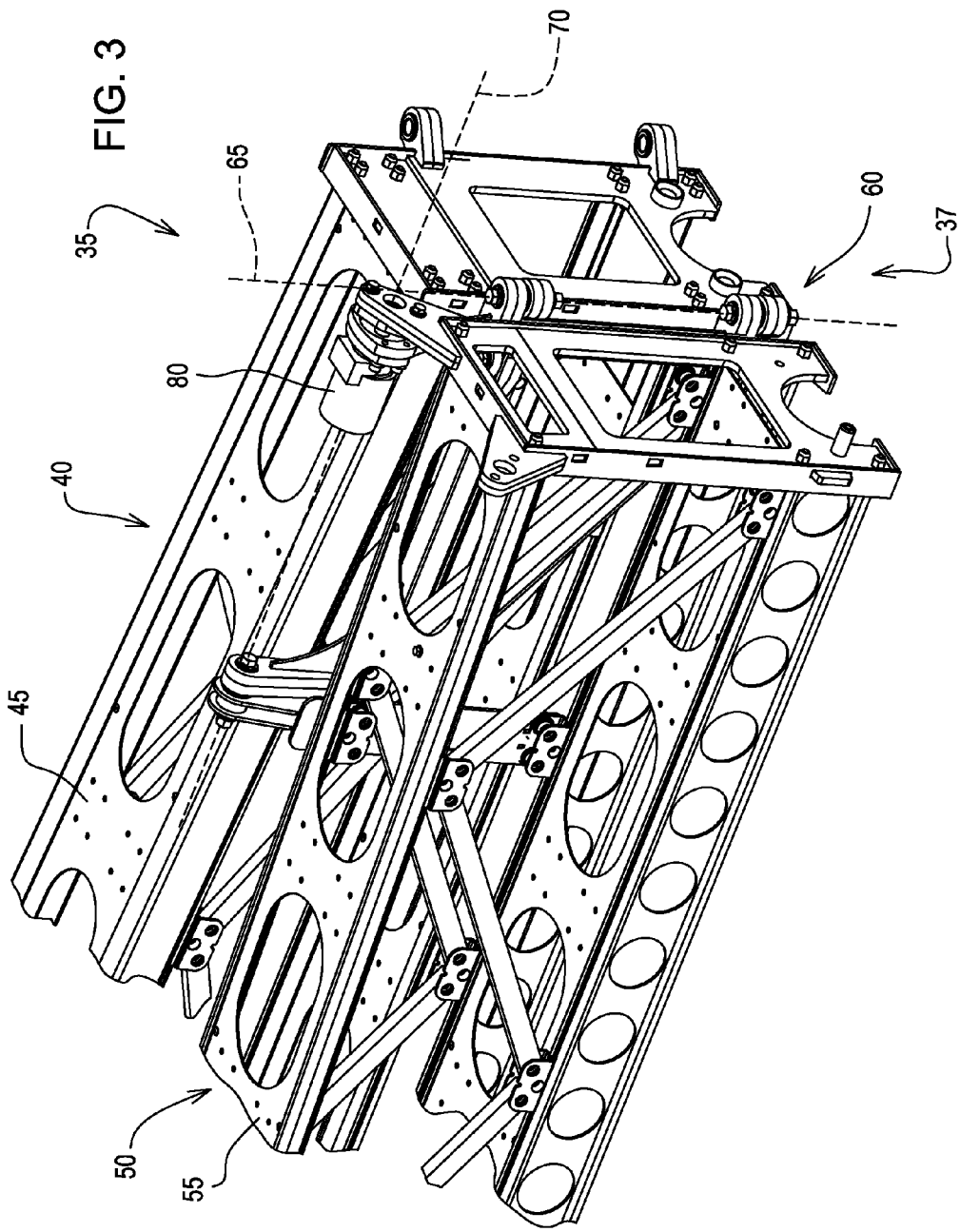
FIG. 3 is an enlarged perspective view of a portion of a boom of the agricultural implement shown in FIG. 1.
Figure 4:
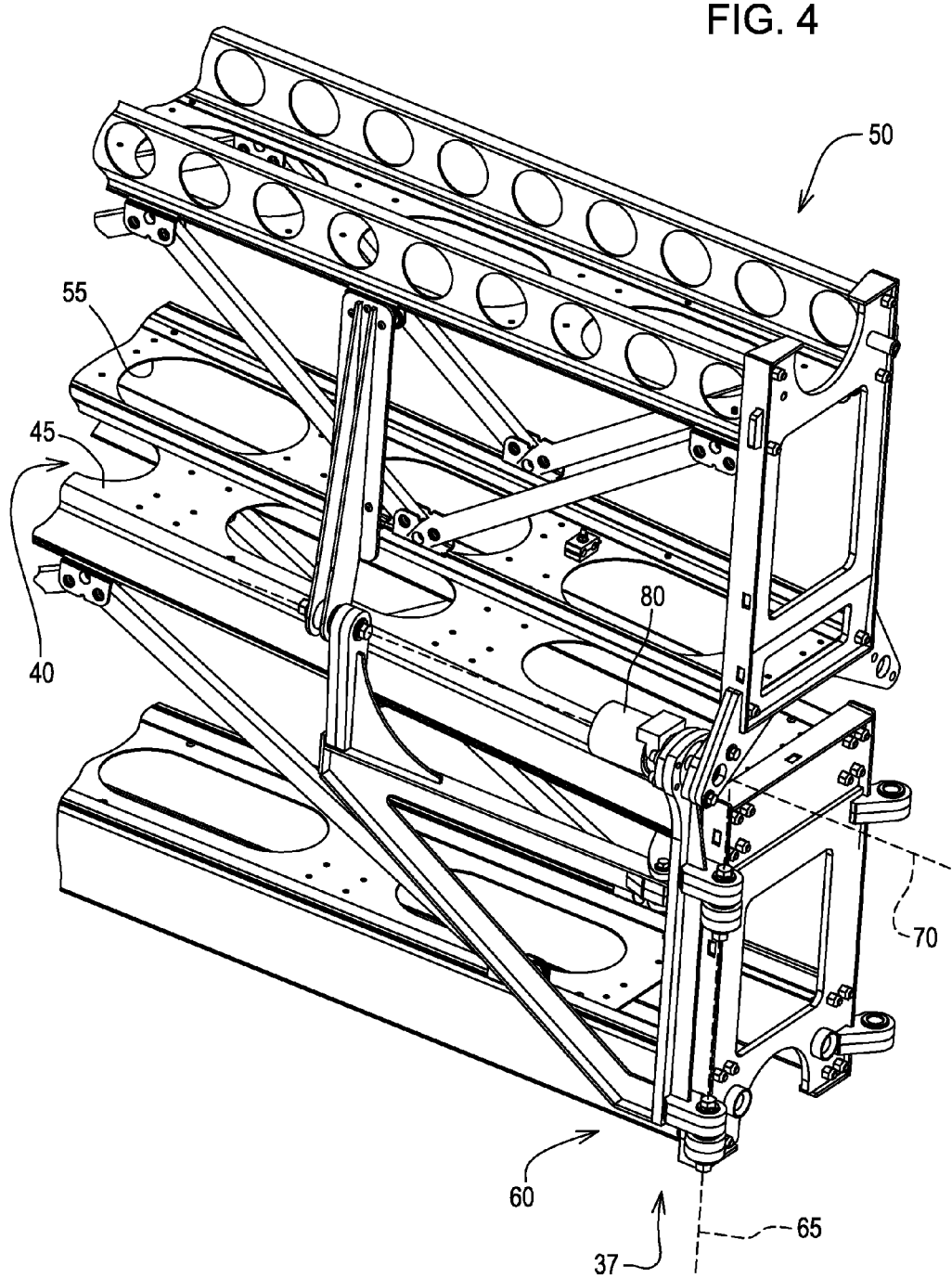
FIG. 4 is an enlarged perspective view of a portion of a boom of the agricultural implement shown in FIG. 1.

Referring to FIGS. 2-4, each boom 35 includes an inner boom portion 40 having an inner boom portion top surface 45. The boom 35 includes an outer boom portion 50 having an outer boom portion top surface 55. A bracket 60 is coupled to the inner boom portion 40 and the outer boom portion 50 for pivotal movement of the outer boom portion 50 relative to the inner boom portion 40 about a first hinge or first axis 65 and a second hinge or second axis 70. The bracket 60 may be aluminum or triangle shaped. The second axis 70 is approximately perpendicular to the first axis 65.

With reference to FIG. 2, a linear actuator 75 may be coupled to the inner boom portion 40. The linear actuator 75 may be used to rotate the outer boom portion 50 relative to the inner boom portion 40 about the first axis 65.

A rotary actuator 80 may be coupled to the bracket 60. The rotary actuator 80 may be used to rotate the outer boom portion 50 relative to the inner boom portion 40 about the second axis 70.

In operation, the outer boom portion 50 is pivoted relative to the inner boom portion 40 about the first axis 65 between a working position in which the inner boom portion 40 and the outer boom portion 50 are aligned lengthwise (FIG. 2) and a first folded position in which the outer boom portion 50 is rotated approximately 180 degrees about the first axis 65 and overlies the inner boom portion 40 (FIG. 3). The outer boom portion 50 is pivoted relative to the inner boom portion 40 about the second axis 70 between the first folded position and a second folded position in which the outer boom portion 50 is rotated approximately 180 degrees about the second axis 70 and the inner boom portion top surface 45 is in a facing relationship with the outer boom portion top surface 55 (FIG. 4). When the boom 35 is in the second folded position, the agricultural implement 10 is in a transport position.

Advantageously, the fold structure 37 of the disclosure enables the outer boom portion 50 to fold approximately 180 degrees about a first axis 65 and approximately 180 degrees about a second axis 70 relative to the inner boom portion 40. The fold structure 37 helps meet a desired transport position width, height, or other requirement of the agricultural implement 10 when the boom 35 is in the second folded position compared to the working position.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

Various features are set forth in the following claims.

What is claimed is:

1. A fold structure for a boom, the boom including an inner boom portion having an inner boom portion top surface and an outer boom portion having an outer boom portion top surface wherein in a working position the inner boom portion is aligned lengthwise with the outer boom portion, the fold structure comprising:
    a bracket;
    a first hinge coupled to the bracket and configured to be pivotally coupled to the inner boom portion; and
    a second hinge coupled to the bracket and configured to be pivotally coupled to the outer boom portion;
    wherein the first hinge is configured to allow the outer boom portion to rotate approximately 180 degrees in a first direction such that the outer boom portion overlies the inner boom portion placing the boom in a first folded position and the second hinge is configured to allow the outer boom portion to rotate approximately 180 degrees in a second direction that is approximately perpendicular to the first direction such that the inner boom portion top surface is in a facing relationship with the outer boom portion top surface, placing the boom in a second folded position.

2. The fold structure of claim 1, wherein the bracket is triangle shaped.

3. The fold structure of claim 1, wherein the second hinge is coupled to the bracket perpendicular to the first hinge.

4. The fold structure of claim 1, wherein the bracket is aluminum.

5. The fold structure of claim 1, wherein the bracket is steel.

6. A boom comprising:
    an inner boom portion comprising an inner boom portion top surface;
    an outer boom portion comprising an outer boom portion top surface; and
    a bracket coupled to the inner boom portion and the outer boom portion for pivotal movement of the outer boom portion relative to the inner boom portion about a first axis between a working position in which the inner boom portion and the outer boom portion are aligned lengthwise and a first folded position in which the outer boom portion is rotated approximately 180 degrees about the first axis and overlies the inner boom portion, and for pivotal movement of the outer boom portion relative to the inner boom portion about a second axis, which is approximately perpendicular to the first axis, between the first folded position and a second folded position in which the outer boom portion is rotated approximately 180 degrees about the second axis and the inner boom portion top surface is in a facing relationship with the outer boom portion top surface.

7. The boom of claim 6, further comprising a linear actuator coupled to the inner boom portion, the linear actuator configured to rotate the outer boom portion relative to the inner boom portion about the first axis.

8. The boom of claim 6, further comprising a rotary actuator coupled to the bracket, the rotary actuator configured to rotate the outer boom portion relative to the inner boom portion about the second axis.

9. The boom of claim 6, wherein the bracket is triangle shaped.

10. The boom of claim 6, wherein the bracket is aluminum.

11. The boom of claim 6, wherein the bracket is steel.

12. An agricultural implement comprising the boom of claim 6, a frame, a pair of transversely spaced wheels coupled to the frame, and a tank coupled to the frame for storing a treatment to be dispensed.

13. The agricultural implement of claim 12, wherein the second folded position of the boom is a transport position of the agricultural implement.

14. An agricultural implement comprising:
a frame;
a pair of transversely spaced wheels coupled to the frame;
a tank coupled to the frame for storing a treatment to be dispensed; and
a boom comprising,
an inner boom portion comprising an inner boom portion top surface;
an outer boom portion comprising an outer boom portion top surface; and
a bracket coupled to the inner boom portion and the outer boom portion for pivotal movement of the outer boom portion relative to the inner boom portion about a first axis between a working position in which the inner boom portion and the outer boom portion are aligned lengthwise and a first folded position in which the outer boom portion is rotated approximately 180 degrees about the first axis and overlies the inner boom portion, and for pivotal movement of the outer boom portion relative to the inner boom portion about a second axis, which is approximately perpendicular to the first axis, between the first folded position and a second folded position in which the outer boom portion is rotated approximately 180 degrees about the second axis and the inner boom portion top surface is in a facing relationship with the outer boom portion top surface.

15. The agricultural implement of claim 14, further comprising a linear actuator coupled to the inner boom portion, the linear actuator configured to rotate the outer boom portion relative to the inner boom portion about the first axis.

16. The agricultural implement of claim 14, further comprising a rotary actuator coupled to the bracket, the rotary actuator configured to rotate the outer boom portion relative to the inner boom portion about the second axis.

17. The agricultural implement of claim 14, wherein the bracket is triangle shaped.

18. The agricultural implement of claim 14, wherein the bracket is aluminum.

19. The agricultural implement of claim 14, wherein the bracket is steel.

20. The agricultural implement of claim 14, wherein the second folded position of the boom is a transport position of the agricultural implement.

* * * * *